US009249573B2

(12) United States Patent
Pegrum (10) Patent No.: US 9,249,573 B2
(45) Date of Patent: Feb. 2, 2016

(54) PARTITION SYSTEMS (71) Applicant: Michael Barrie Pegrum, Surrey (GB)

(72) Inventor: Michael Barrie Pegrum, Surrey (GB)

( * ) Notice: Subject to any disclaimer, the term of this patent is extended or adjusted under 35 U.S.C. 154(b) by 0 days.

(21) Appl. No.: 14/376,798

(22) PCT Filed: Feb. 7, 2013

(86) PCT No.: PCT/GB2013/050286
§ 371 (c)(1),
(2) Date: Aug. 5, 2014

(87) PCT Pub. No.: WO2013/117931
PCT Pub. Date: Aug. 15, 2013

(65) Prior Publication Data
US 2015/0013922 A1     Jan. 15, 2015

(30) Foreign Application Priority Data

Feb. 8, 2012   (GB) .................................. 1202201.8
Sep. 12, 2012  (GB) .................................. 1216341.6

(51) Int. Cl.
*E04B 2/74*     (2006.01)
*E04B 2/00*     (2006.01)
*F41H 5/013*    (2006.01)
*F41H 5/24*     (2006.01)
(Continued)

(52) U.S. Cl.
CPC ................. *E04C 2/44* (2013.01); *B62B 5/0083* (2013.01); *E04B 2/7422* (2013.01); *F41H 5/013* (2013.01); *F41H 5/24* (2013.01); *B62B 5/049* (2013.01); *E04B 2/827* (2013.01); *E04H 9/10* (2013.01)

(58) Field of Classification Search
CPC ......... E04C 2/44; B62B 5/0083; B62B 5/049; E04B 2/7422; E04B 2/827; E04H 9/10; F41H 5/24; F41H 5/013
See application file for complete search history.

(56) References Cited

U.S. PATENT DOCUMENTS 1,444,447 A  *  2/1923  Bate ................................ 254/98
3,208,744 A  *  9/1965  Slifer, Jr. ........................ 269/247
(Continued)

FOREIGN PATENT DOCUMENTS

DE      2405027 A1    8/1975
DE      3147631 A1    6/1983
(Continued)

OTHER PUBLICATIONS

Kunal Saujani, "Search Report" UK Intellectual Property Office, GB1202201.8; Jun. 14, 2012.
(Continued)

*Primary Examiner* — Katherine Mitchell
*Assistant Examiner* — Abe Massad
(74) *Attorney, Agent, or Firm* — Bradley Arant Boult Cummings LLP (57) ABSTRACT A panel structure for a demountable partition system usable for dividing a room or for forming rooms and/or corridors or other structures, the panel structure having two opposite major faces and in use being positioned in a generally upright orientation with other such panel structures of the system, in which there are provided one or more rolling elements movable using a gearbox mechanism between an extended, ground-contacting position, and a retracted position within the panel structure, wherein the rolling elements and the gearbox mechanism are disposed in relation to the panel structure to preserve an operating characteristic of the panel structure.

14 Claims, 10 Drawing Sheets (51) Int. Cl.
*B62B 5/00* (2006.01)
*E04B 2/82* (2006.01)
*E04H 9/10* (2006.01)
*B62B 5/04* (2006.01)

(56) References Cited

U.S. PATENT DOCUMENTS

| | | | |
|---|---|---|---|
| 4,731,964 A | | 3/1988 | Phillips |
| 4,843,947 A | * | 7/1989 | Bauer et al. ............ 89/36.05 |
| 5,301,934 A | * | 4/1994 | Lynn et al. ............... 269/222 |
| 5,971,408 A | | 10/1999 | Mandel et al. |
| 7,383,761 B2 | * | 6/2008 | Warren et al. ............ 89/36.02 |
| 2007/0245933 A1 | | 10/2007 | Kramer et al. |
| 2009/0090475 A1 | | 4/2009 | Raniere |
| 2012/0160087 A1 | | 6/2012 | Sigurdson |

FOREIGN PATENT DOCUMENTS

| | | |
|---|---|---|
| EP | 0697296 A1 | 2/1996 |
| EP | 0911455 A1 | 4/1999 |
| GB | 1290599 | 9/1972 |
| GB | 2464450 A | 4/2010 |
| JP | 953287 | 2/1997 |
| JP | 9105191 | 4/1997 |
| JP | 2001317141 | 11/2001 |
| JP | 200420662 | 1/2004 |
| JP | 2005163329 | 6/2005 |

OTHER PUBLICATIONS

De Jong, Coen, "Notification of Transmittal of the International Search Report and the Written Opinion of the International Searching Authority" European Patent Office, PCT/GB2013/050286; Sep. 13, 2013, pp. 1-16.

Wukovnig, Siegfried "Intellectual Property Office of Singapore—Search Report and Written Opinion—Singapore Patent application No. 11201404740S" Dec. 5, 2014; pp. 1-21.

* cited by examiner

PARTITION SYSTEMS

The present invention relates generally to partition systems, and particularly to a partition system having features which fit it for special purposes.

Partition systems as such are widely known, and used for various purposes, especially for dividing large open-plan spaces such as offices into smaller chambers for convenient occupation by one person or by small groups of people. It is also known to provide partition systems for military training, in which case the systems are somewhat heavier and more extensive than the lightweight civilian partition systems used simply for dividing the interior space of a building. In particular, military training partition systems are used to create an environment which can be used aggressively for attack or defence training, and may even be provided with closable doors or windows. If the partition systems are to be used for live ammunition military training it is necessary for the individual panels for the system to be rendered bullet-proof, and it is a particular feature of the present invention that various improvements to how this may be achieved are provided.

One of the disadvantages of military training partition systems lies in the fact that, because of their robust function, they are rather heavy to move into place presenting a need for mechanical handling devices, or the presence of overhead gantries or ground rails. Even lightweight civilian partition systems require a certain physical effort to locate them in place or to relocate them when changes are being effected.

The present invention seeks, therefore, to provide a panel structure for a demountable partition system which overcomes this disadvantage, and even when made as a heavyweight robust military training partition can be moved easily from one place to another without requiring heavy lifting equipment.

According to one aspect of the present invention, therefore, there is provided a panel structure for a demountable partition system usable for dividing a room or for forming rooms and/or corridors or other structures, the panel structure having two opposite major faces and in use being positioned in a generally upright orientation with other such panel structures of the system, in which there are provided one or more rolling elements movable using a gearbox mechanism between an extended, ground-contacting position, and a retracted position within the panel structure, wherein the rolling elements and the gearbox mechanism are disposed in relation to the panel structure to preserve an operating characteristic of the panel structure.

By making each individual panel structure readily movable it allows changes to be made quickly and easily using a minimum of resources.

In a preferred embodiment of the invention the rolling elements lie between the two major faces of the panel structure in the retracted position thereof. In this embodiment the said rolling elements are wheels mounted in groups with each group on a common support. Each group may comprise two or four wheels although groups with more than this may be provided if appropriate.

In order to facilitate the elevation of the panel to its rolling position, the mechanism for effecting displacement of the rolling elements between the said extended and retracted positions may comprise or include a lead screw which causes or allows the rolling elements to move between the said extended and retracted positions when turned about its longitudinal axis. Such lead screw ideally lies on a generally vertical axis.

Two or more groups of rolling elements may be linked together for displacement thereof between the said extended and retracted positions in unison upon operation of a control member. The control member may comprise an elongate shaft extending parallel to the plane of the panel structure, with an end thereof accessible from one end of the panel structure to allow operation thereof to raise or lower the panel structure. The control member may comprise an elongate shaft extending at right angles to the plane of the panel structure for the same operation. Operation of the control member may be effected by a lever or crank handle or other suitable means.

At least some of the supports carrying the ground-engaging wheels may be linked together by a chain and sprocket whereby two move together between their retracted and extended positions. Alternatively at least some of the supports carrying the ground engaging wheels may be linked together by a gear train whereby to move together between their retracted and extended positions.

To facilitate movement in all directions the ground-contacting rolling elements may be steerable or at least turnable about a vertical axis in the manner of castors.

Between the horizontally extending control member and the lead screw which causes or allows the rolling elements to move between the extended and retracted positions there may be a bevel gear or helical or worm gear.

Panel structures intended for the construction of military training environments may be provided with a reinforced, substantially bullet-proof layer between the said two major faces. The bullet-proof layer preferably lies in a plane inclined to the family of planes defined by the said two major faces of the panel. As will be described in more detail below, this has the advantage that if the edges of the panels are formed as half lap tongues the bullet-proof layer can extend in to the tongues so that the bullet-proof layers of adjacent panels overlap at the edges ensuring there is no risk of a weakness at the connection point between two panels.

Further protection may be provided if at least part of the space between said two major faces of the panel structure contains a particulate material. Such material may be, for example, a hard stone aggregate, ceramic or metal balls, such as steel balls, or other particles, or sand. Bullets penetrating the outer face of the panel structure are thus deflected by the hard particulate material ensuring that they always arrive at the bullet-proof layer at an angle thereby making this more effective.

The present invention further comprehends, therefore, a panel structure for a demountable partition system for dividing and forming rooms and/or corridors, the panel structure having two opposite major faces and being defined along at least two opposite sides by edges having half lap tongues which overlap one another when two such panel structures are placed in juxtaposition with respect to one another.

Although it would be possible for the tongues at two opposite edges to be aligned with or coplanar with one face, it is preferred that the tongue at one edge is coplanar with one face and the tongue at the opposite edge is coplanar with the other face so that this facilitates the inclination of the bullet-proof layer passing from one side to the other and from within one half lap tongue to the other.

The present invention also extends to a partition system incorporating one or more panel structures as defined hereinabove.

A further aspect of the invention comprises a panel structure as claimed in claim 1, in which the rolling elements lie between the said two major faces of the panel structure in the retracted position thereof.

Various embodiments of the invention will now be more particularly described, by way of example, with reference to the accompanying drawings in which.

Figures 1, 1A:
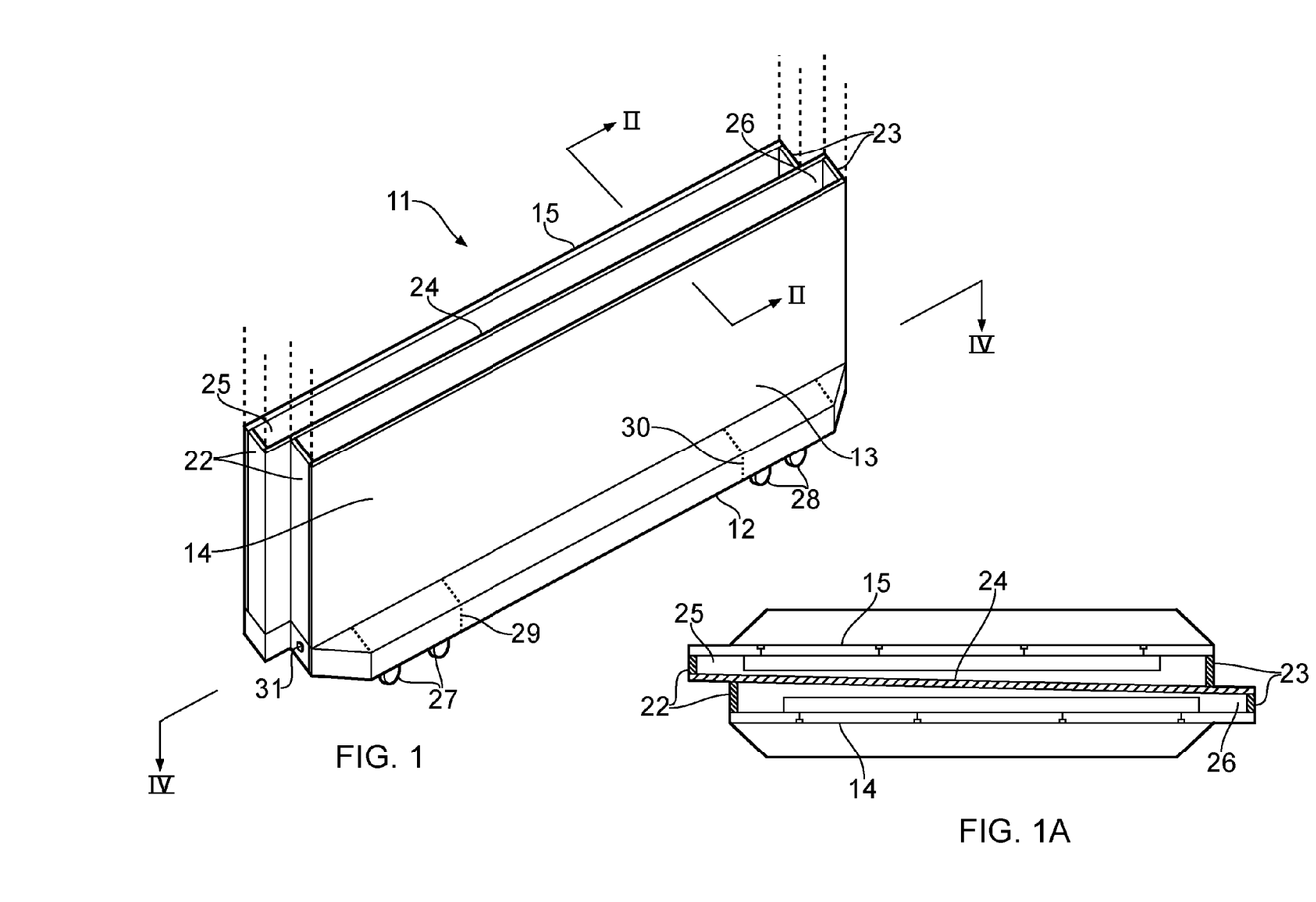
FIG. 1 is a schematic perspective view of a demountable panel structure formed in accordance with the principles of the present invention.
FIG. 1A is a plan view from above of the panel structure shown in FIG. 1.

Referring now to the drawings, and particularly to FIG. 1 thereof, a rapidly locatable demountable panel generally indicated 11 and formed in accordance with the principles of the present invention, comprises two main parts, a lower or base part 12 and an upper or panel section generally indicated 13.

As mentioned hereinabove the base portion 12 of the demountable panel assembly 11 may in fact be produced separately and adapted to support other superstructures than the panel 13. However, in the present description it will be referred to specifically as a component part of the composite panel assembly 11.

Figure 2:
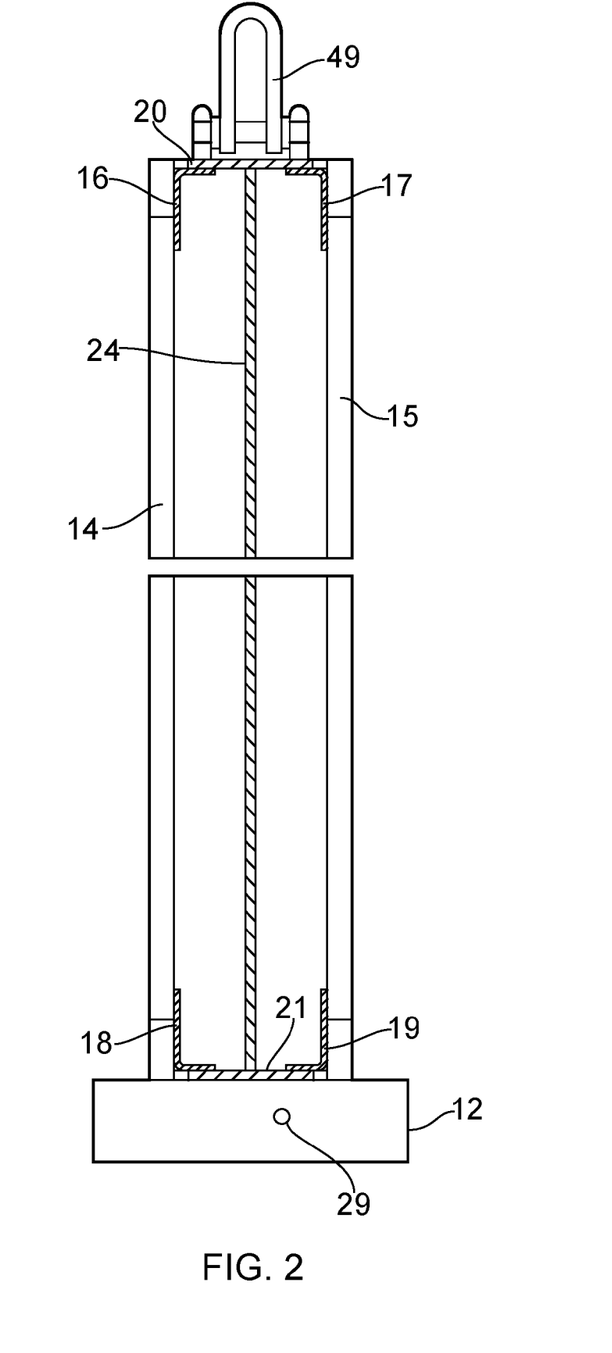
FIG. 2 is a sectional view taken on the line 11-11 of FIG. 1.
Figure 3:
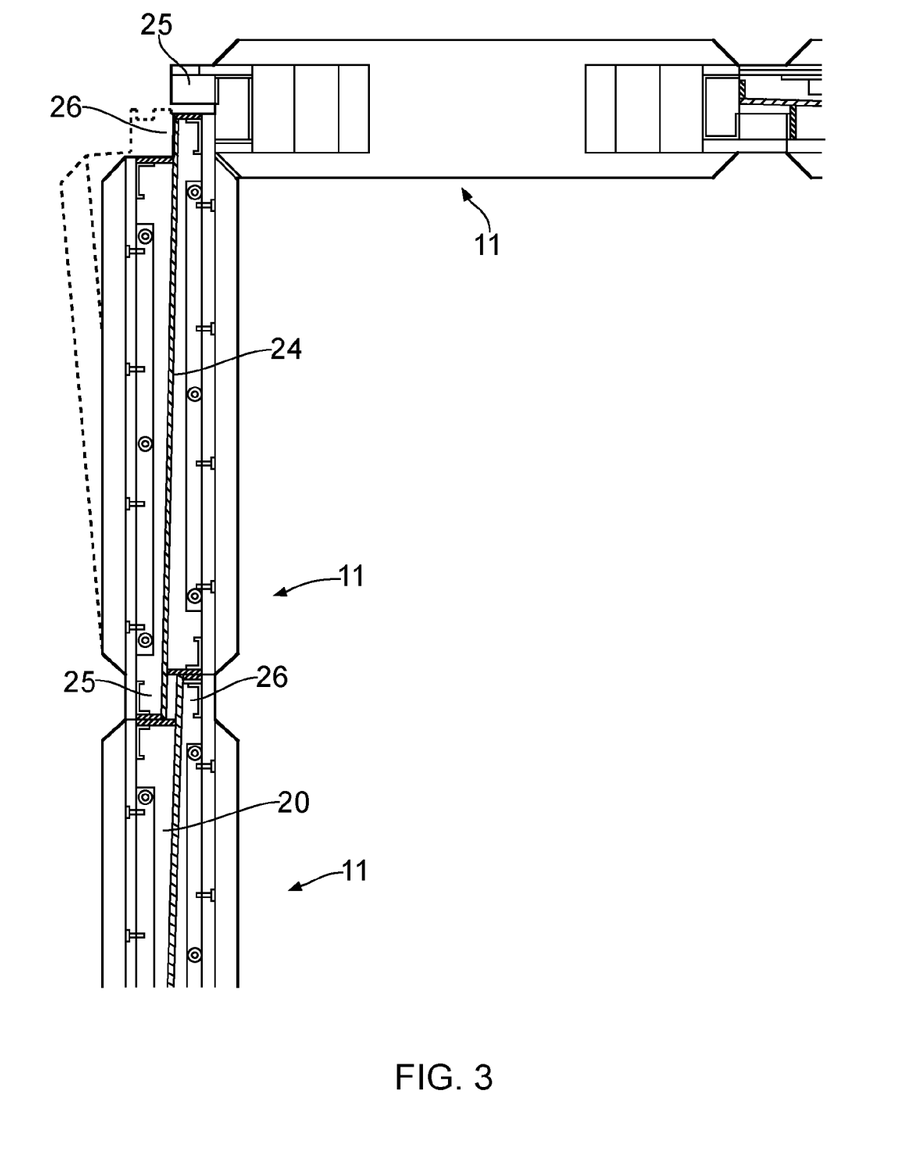
FIG. 3 is a plan view from above showing the interconnection of several demountable panels such as that illustrated in FIG. 1.

As can be seen particularly in FIGS. 1 to 3, the panel section 13 of the assembly comprises two oppositely facing outer wall panels 14, 15 with an anti-ricochet lining, secured at top and bottom (as can be seen in FIG. 2) by respective angle brackets 16, 17 and 18, 19 to respective upper and lower edging strips 20, 21 and end strips 22 and 23.

The upper and lower edging strips 20, 21 and the end strips 22 and 23 are secured to a central stiff bullet-proof plate 24, which as can be seen in FIGS. 1 and 3, lies at an angle inclined shallowly to the two opposite wall panels 14, 15. At each end of the partition panel 13, are respective half lap tongues 25, 26 each being offset on the opposite side of the panel centre line from the other so that, as can be seen in FIG. 3 two panel structures 11 can be fitted together edge to edge with the respective tongues 25, 26 overlapping one another or fitted at right angles to one another with one tongue 26 fitting against the tongue 25 of the adjacent panel 11. FIG. 3 also illustrates how the bullet-proof central panel 24 overlaps at adjacent edges of continuous panels to ensure there is no weakness at the junction.

The base portion 12 of the panel structure 11, on which the upper partition panel portion 13 is carried, is itself wider than the thickness of the panel portion 13, and is provided with wheel sets 27, 28 within gearboxes 29, 30 (which will be described in more detail below) which can be lowered to allow transport and manipulation of the panel structure 11, or raised to allow the base portion 12 to rest firmly on the ground where it remains by friction. The raising and lowering of the wheel sets 27, 28 is achieved by operating on a control member 31, in this embodiment the square end of a drive rod 32 illustrated in FIG. 4.

Figure 4:
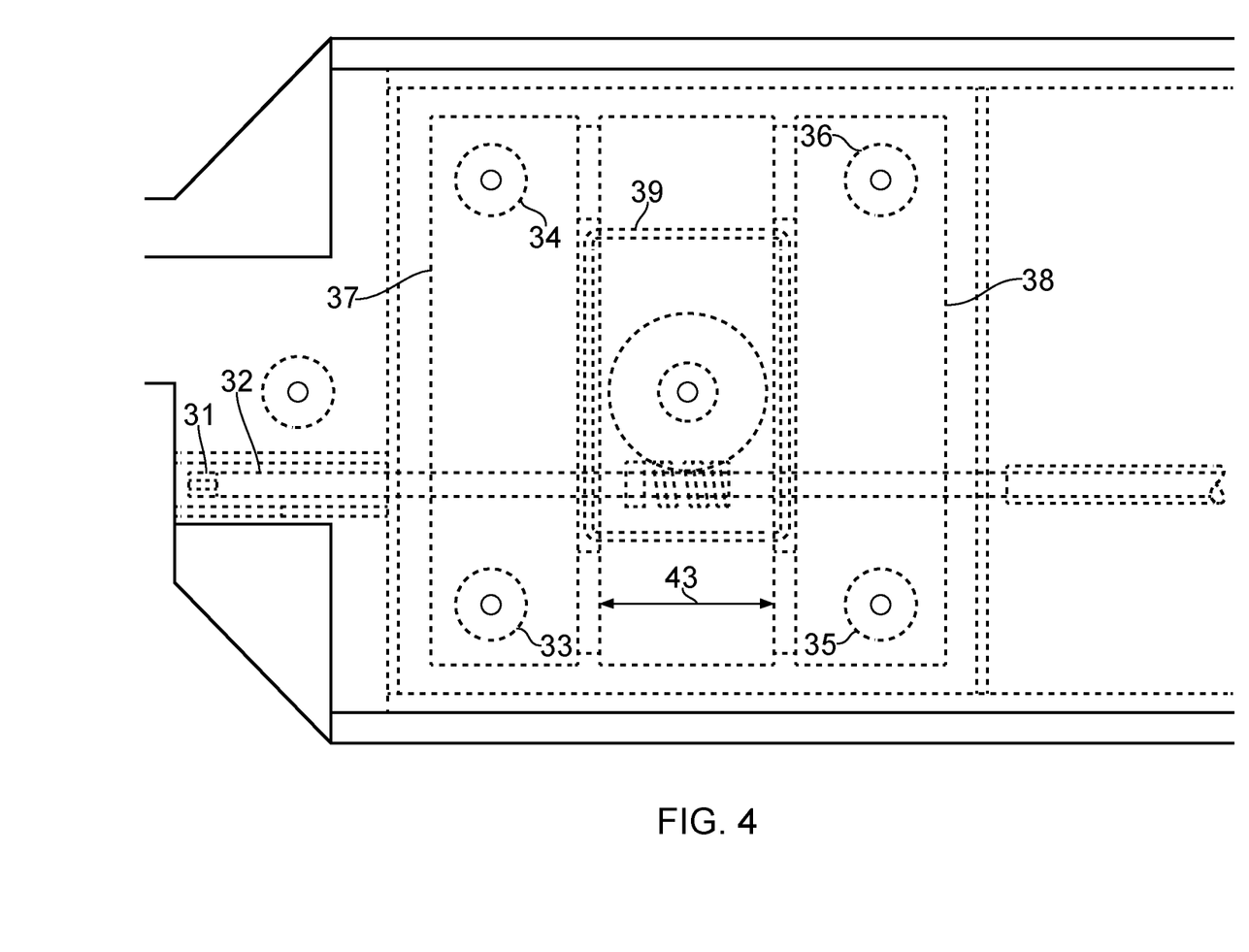
FIG. 4 is a sectional view from above, in plan, taken on the horizontal plane generally indicated by the line IV-IV of FIG. 1.
Figure 5:
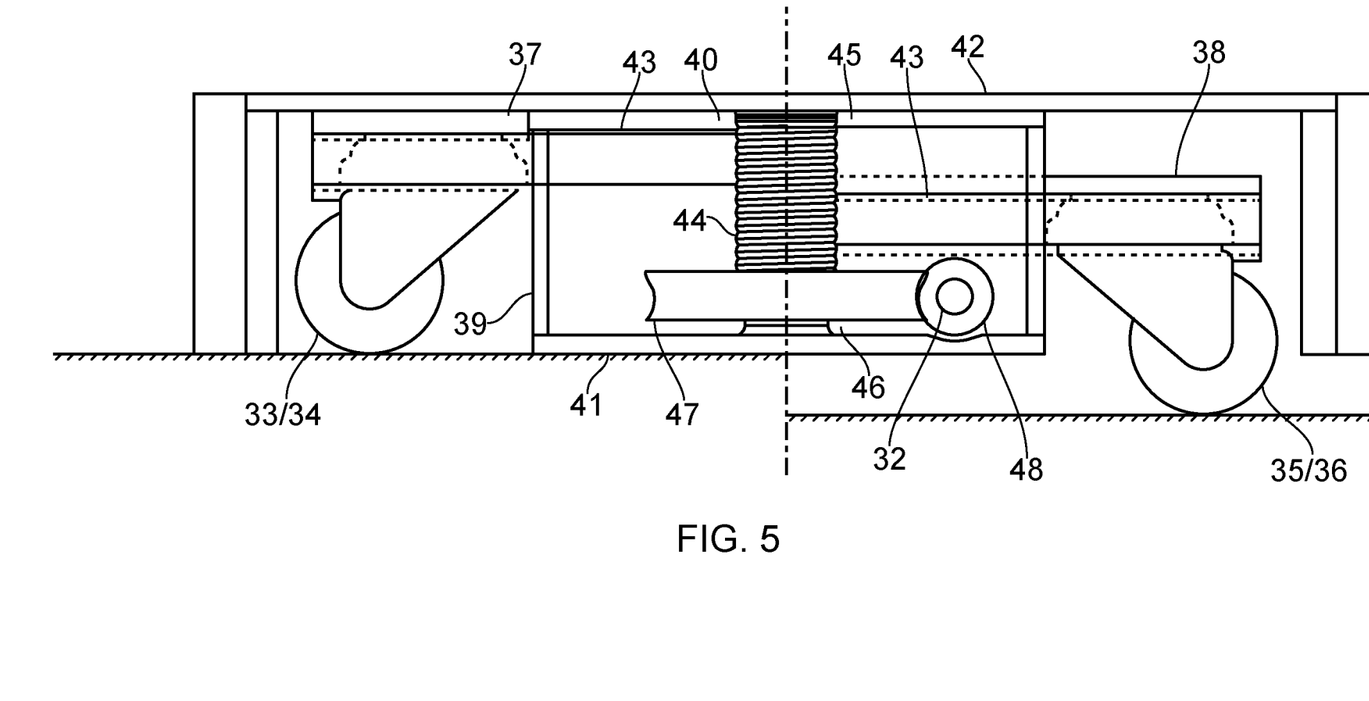
FIG. 5 is a sectional view through the base portion of the panel of FIG. 1, taken on the line V-V of FIG. 4 showing the rolling elements in the raised and lowered position.
Figure 6:
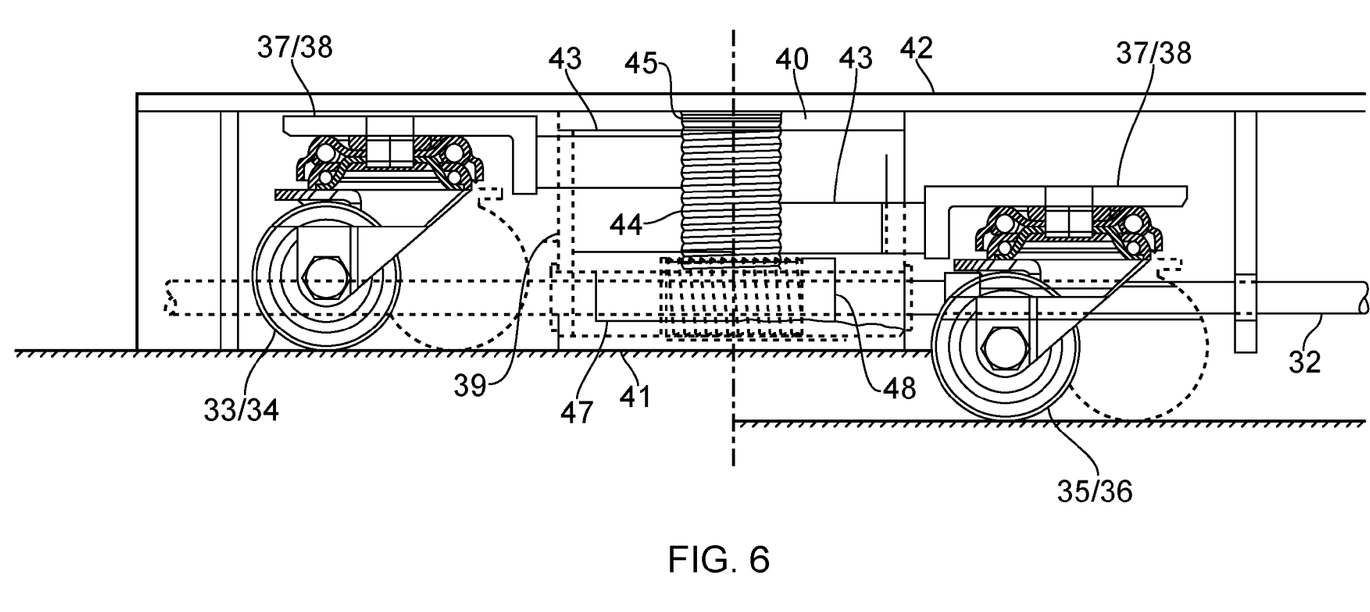
FIG. 6 is a similar sectional view though the base portion of the panel of FIG. 1, taken on the line VI-VI of FIG. 4.

As can be seen in FIGS. 4 to 6 the wheel sets 27, 28 each comprise four castors. The four castors of the set 27 can be seen in FIG. 4, comprising castors 33, 34 on the left hand side and 35, 36 on the right hand side. The left hand castors 33, 34 are carried on a common carriage 37 and the castors 35, 36 on the right hand side are carried on a common carriage 38.

The gearboxes 29, 30 comprises a tube 39 spanned by an upper plate 40 and carried by a lower base plate 41. The upper plate 40 is in turn welded to a cover plate 42. In figure 5 the left carriage 37 is shown in the raised position and the right carriage 38 is shown in the lowered position. For convenience of illustrating the control mechanism which will be described in more detail below, the ground level is shown at different heights in the left and right part of, FIG. 5.

The left and right carriages 37, 38 are joined by a threaded plate 43 through which passes a respective lead screw 44. The lead screw is borne by a thrust bearing 45 at its upper end, bearing against the cover plate 42 and a respective plain bearing 46 in the base plate 41.

At its lower end the lead screw 44 carries a worm wheel 47 driven by a bored worm 48 for rotation with the drive rod 32.

The left hand side of each of FIG. 5 and 6 shows the configuration of the components of the gearboxes 29, 30 with the rolling elements raised and the base 12 resting on the ground. In this configuration the carriage 37 is at the upper end of the lead screw 44 and the castors 33, 34 are raised to a point where their lower running surfaces are just higher than ground level so that the base plate 41 rests on the ground and the panel structure is effectively immovable.

Should it be desired to move the panel structure 11 this is achieved by applying a tool to the operating end 31 of the drive rod 32 to cause the bored worm 48 to turn and consequently to turn the worm wheel 47 which, via the lead screw 44 causes the threaded plate 43 to travel down the lead screw 44 from the position illustrated on the left hand side of FIGS. 5 and 6 to the position illustrated on the right hand side of these Figures, such that the castors carried by the carriages 37, 38 are lowered to a position below the level of the base plate 41, contacting the ground and thereby raising the base 12. As will be appreciated the forces exerted by the castors are transmitted by the carriages 37, 38, via the threaded engagement with the lead screw 44 to the thrust bearing 45 and thus up on to the upper cover plate 42 of the base portion 12 which is the effective load-bearing part of the structure on which the upper panel 13 rests.

Lowering of the base 12 once appropriately positioned is achieved by reversing the rotation of the drive rod 32.

For use in military training, where live ammunition may be used, it is of value to fill the interspace between the wall panels 14, 15 and the central bullet-proof panel 24 with a hard particulate material, such as stone aggregate, sand, metal (such as steel) balls or the like.

The inner faces of the wall panels 14, 15 may be further reinforced by a thin hard material such as steel or aluminium plate. The wall panels 14, 15 may also have an anti-ricochet finish and the steel or aluminium plate may be incorporated in or located adjacent the anti-ricochet finish. It can be that certain types of bullet impinging on this structure may be caused to tumble and cause less damage to the central bullet-proof plate 24.

As will be appreciated from FIG. 3, the presence of the half lap joint at a corner such as that illustrated in FIG. 3 presents two changes to direction of any bullet penetration of the corner joint without requiring the use of a corner post for this purpose.

Security of connection may be improved by the use of hinged piling shackles such as its shackle 49 at top of FIG. 2, which serve a dual purpose for lifting the panels and for holding them together by laying them horizontally over steel lugs (not shown) which may protrude from the tops of the panels such that the panels cannot be displaced laterally from one another in a long run. Likewise, projecting lugs welded to the tops of the panels may assist in achieving stability if slotted plate fittings are located over such lugs.

As can be seen in FIG. 1 the base 12 is wider than the panel 13 which makes the partition assembly stable when standing alone or in storage, or awaiting assembly with other such panels. The presence of the retractable wheels entirely within the base 12 ensures that there is no restriction on what form of superstructure can be carried by the base. This also means that the base may be used in its own right as a lifting device for heavy items such as pallet bases.

Figure 7:
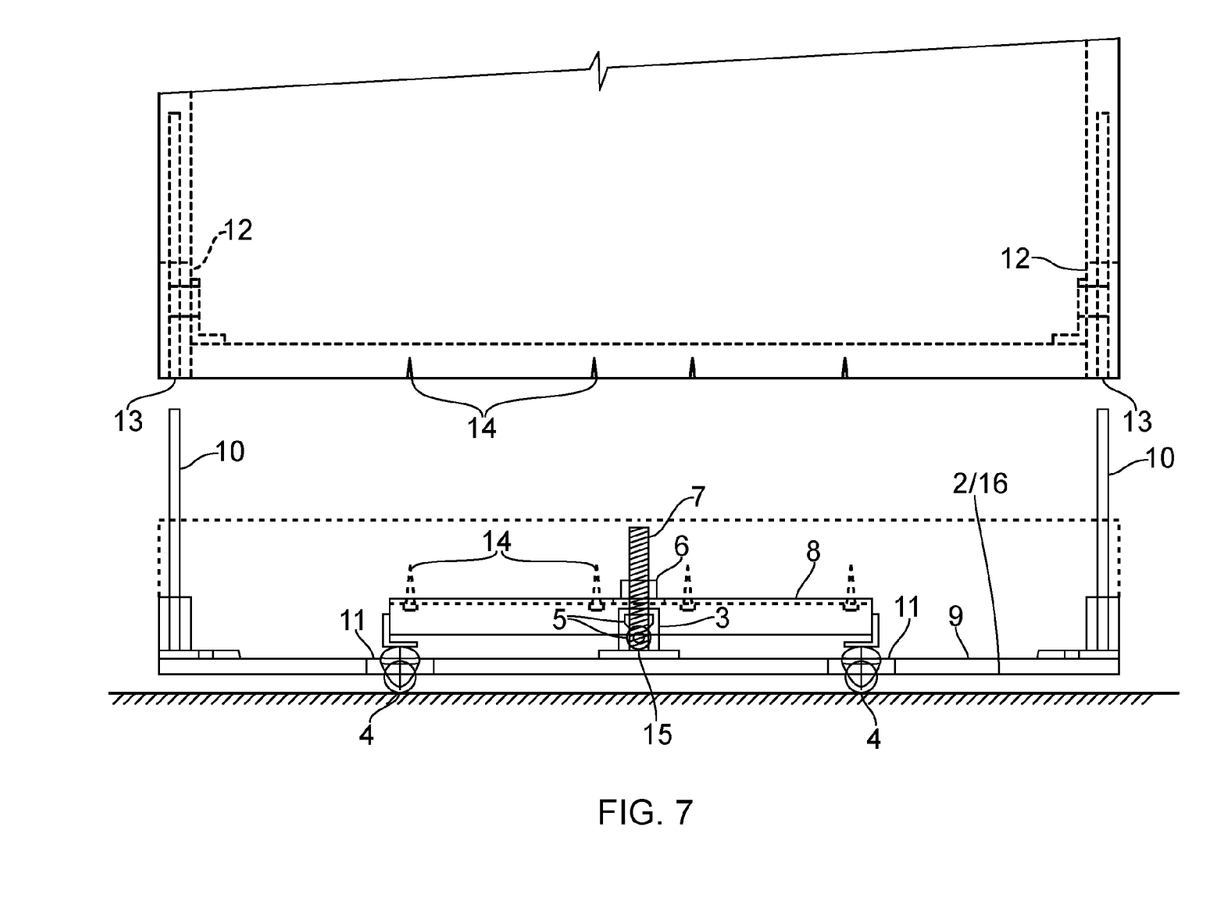
FIG. 7 is a sectional view of a partition panel according to an example.
Figure 8:
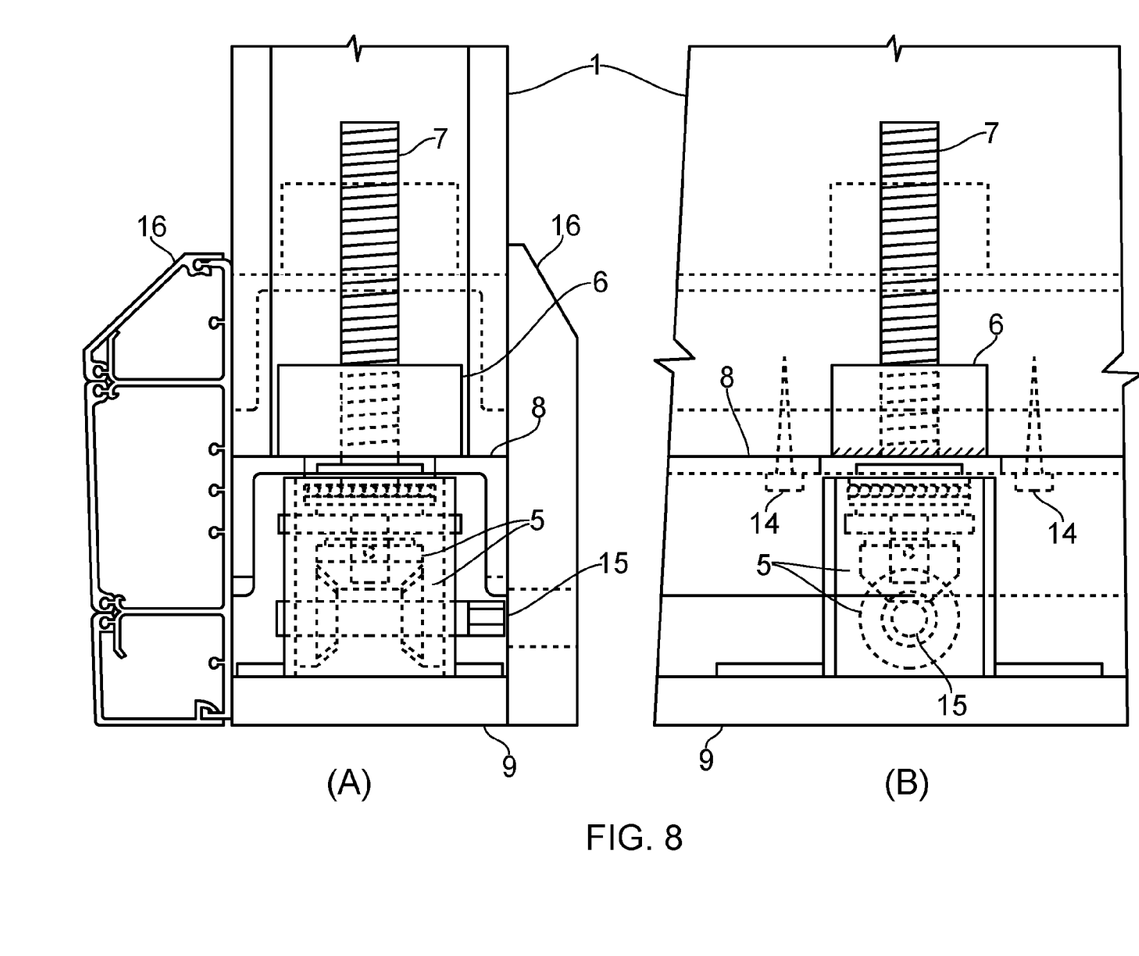
FIG. 8 shows two sectional views of a portion of a partition panel according to an example.
Figure 9:
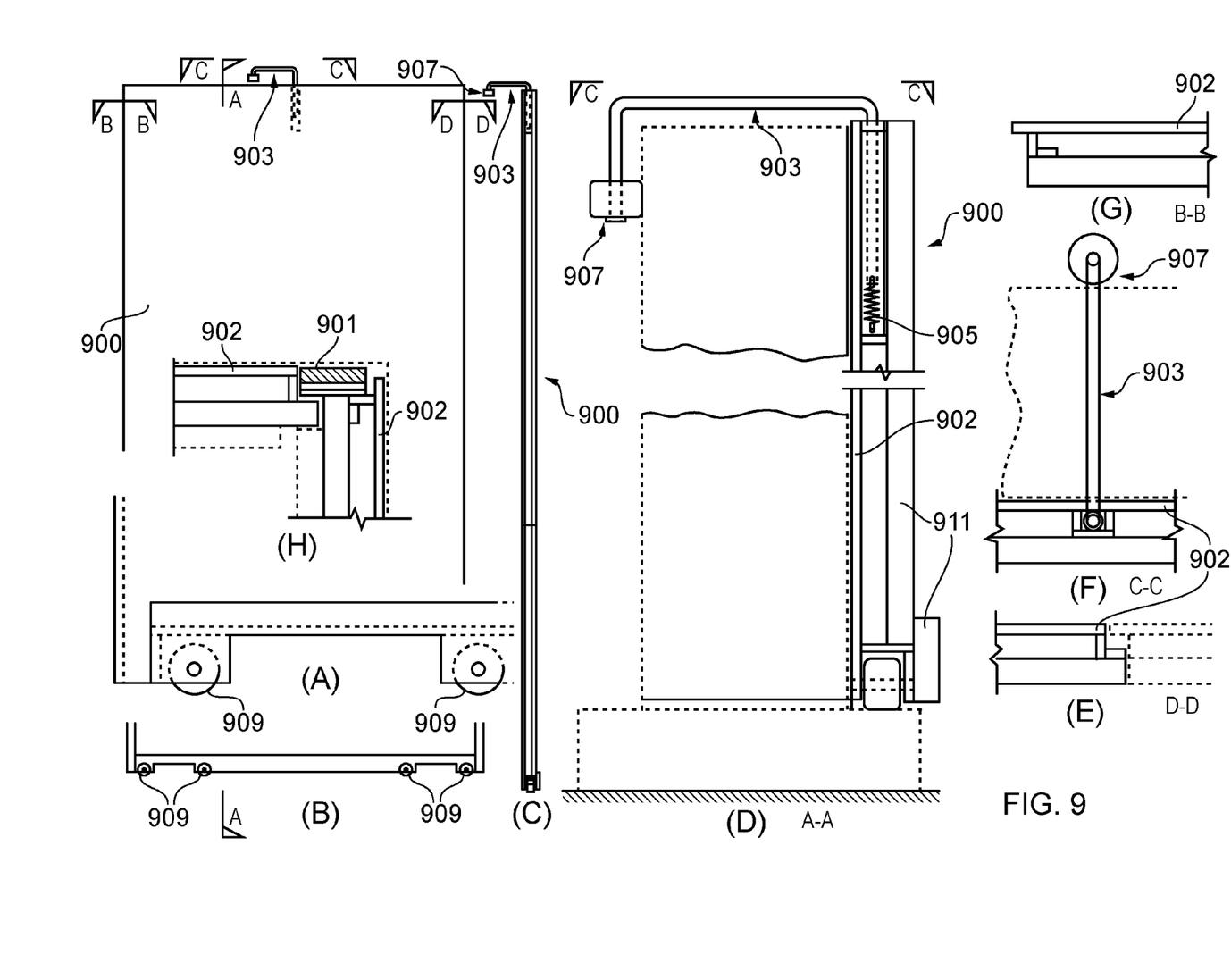
FIGS. 9A-H show sectional views of a bulletproof cover plate according to an example.

The gearboxes 29, 30 could be replaced with hydraulic load cells or skates to operate the wheel assemblies and raise or lower the panel When panels are being rolled along, they can by virtue of a hook or similar connection, carry another panel which, for whatever reason, does not have wheel assemblies According to an example, a partition panel 1, such as a panel for commercial use, and which need not therefore include a bulletproof panel, can be connected to a base unit (2) that includes a gearbox (3) and rising and falling castors such as is depicted in figures 7 and 8. When the gearbox is operated, the castors lower out of the bottom of the base thus lifting the panel to enable it to be re-positioned. Once positioned the gearbox can be reversed such that the castors rise so that the panel rests on the floor. If the gearbox is operated further, the panel can be made to rise up from its base to close a gap to the ceiling, thereby forming a useful partition for a home or office environment for example. In an example, such a panel can be soundproofed such as by the addition of a sound proofing panel, or other sound proofing material with desired acoustic properties within a cavity defined with the panel structure.

The central gearbox (3) can include bored worm and worm-wheel or two bevel gears (5) either of which are fixed to a threaded block or plate (6) which rises up and down a vertical lead screw (7). The threaded block or plate is fixed to a castor carriage (8) that has single or multiple castors (4) at each end. The gearbox is fixed to a base (9) running the length of the panel to which is attached, at each end, a vertical guide rod (10). The base has holes to allow the castors to pass through (11).

According to an example, the partition panel (1) is the same length as the base (9) and includes two guide blocks (12) at its bottom corners with holes (13) therethrough that fit onto the guide rods. The bottom of the panel can then be screwed to the castor carriage (14). The gears (5) can be operated with a rod activator (15) using a spanner or a rotating device for example.

The mechanism can be hidden from view by fixing different sorts of skirting boards (16) to the base for example.

In order to maintain the integrity of certain aspects of the panels as described above with reference to certain examples, a mechanism as described to facilitate raising or lowering of a panel structure is self-contained at the bottom of the structure and can be fixed to the underside of the panel. Accordingly, many different types of panel can be fitted on top of such a mechanism.

According to an example, the provision of self-contained mechanism obviates a requirement to intrude into a panel, thereby preserving, for example, bullet proofing and/or acoustic performance of the structure by maintaining the integrity of the major faces of the panel such that no interference with those faces is required in order to be able to actuate the mechanism for extending or retracting the rolling elements. For example, operating a gearbox mechanism as described above is effected using actuation means such as a rod activator (15) or drive rod (32), the access points to which are provided externally to or at the face of a panel such that intrusion into the panel is not needed. Furthermore, the disposition of the gearbox mechanism, related actuation means and carriages to carry wheels or castors is such that the integrity of a panel can be maintained without the requirement for any part of a mechanism to interfere with the desired characteristics of such a panel, such as acoustic properties (inasmuch as the panel can be sound proofed for example), or its ability to be bullet proof as described above. In this connection, a gearbox as described can be provided as a standalone lifting and moving device in an example.

Accordingly, an operating characteristic of a panel structure, such as bullet or acoustic proofing, can be preserved over the entirety or a large portion of a panel, such as the operating portion of the panel, which can be thought of as the portion of the panel which is, in use, subject to certain conditions which make the characteristics of the panel desirable. For example, in an office environment, an operating portion can be a portion of a panel for which it is desirable to have sound proofing so that different areas of an office environment can be acoustically isolated from one another. Typically, such an operating portion will include the majority of the panel, but more focussed isolation in certain portions can be provided for example.

According to an example, a panel structure as described herein can also be provided in a non-bulletproof form. Such panels can be used for training with less-than-lethal ammunition for example. Such non-bulletproof panels can be generally similar in shape, size and profile to bulletproof panels as described, except that need not have a central core of bulletproof material.

When occasions arise that may necessitate the use of lethal ammunition for example, a bulletproof cover plate can be fitted over a non-bulletproof panel to make it bulletproof. In an example, such a bulletproof cover plate comprises a sheet of bulletproof material, typically but not limited to armoured steel overlaid with anti-ricochet material for example.

A bulletproof cover plate can include a set of wheels or similar located at the bottom to allow it to slide into position. A restraining wheel or other suitable arrangement can be provided at the top of the plate to hook over the non-bulletproof panel so that the cover engages therewith to stop the plate falling over for example.

FIGS. 9A-H show partial sectional views of a bulletproof cover plate according to an example. A bulletproof cover plate 900 according to an example has an overlap detail along its vertical edges to prevent bullets passing through any slight gap between panels when they are arranged together to form a structure and so on, as shown in 9H for example. Where these overlap details meet at a corner, a vertical strip of bulletproof steel can be magnetically attached to one panel to block the gap. A cover strip 901 can include an armour plated section mounted to wood for example, with magnetic material on the armour side.

According to an example, a cover plate includes a bulletproof or bulletproofed major face 902. A generally U-shaped rod structure 903 is provided with one end mounted onto or within the body of the plate 900, and the other end arranged to extend over a top of a panel to which the cover plate is to be fixed, such as a non-bulletproof panel for example. In an example, the end mounted within the plate is attached to the plate using a biasing device 905 such as a retaining spring in order to enable the rod structure to be flexible (primarily in a vertical direction for example) in order to assist in engaging the rod structure with a panel. The other end of the rod, which sits 'at the back' of the panel, or rather at the effectively non-bulletproof side of the panel, can include a caster, wheel or other device 907 arranged to rest on the panel, and thereby allow the cover plate to be shifted so that, if desired, the major face thereof can be translated parallel to the major face of the panel. This also assists in mounting the cover plate, as it can be slid onto the panel with the caster or wheel rolling across the panel, thereby enabling easy movement of the cover plate. In this connection, one or more casters or wheels 909 at the base of the cover plate can be provided and serve to enable the plate to be moved without the bottom engaging with the floor or other obstructions.

In an example, a cover plate includes an armoured, bullet-proof layer 902 and an outer non-bulletproof layer 911, such as wood or synthetic material, which can be used to receive coatings such as paint and so on.

Typically, multiple casters or wheels at the base of the plate are mounted partially within the plate 900. This can help to maximise the area that the plate provides bulletproofing over.

In an example, non-bulletproof and bulletproof panels as well as cover plates can be transported using a purpose-designed trolley. According to an example, such a trolley can be provided to assist a user when moving a panel structure as described herein. For example, a trolley including out-rigged castors can be provided that can clamp onto a panel so that when it is being manoeuvred it is stable.

Figure 10:
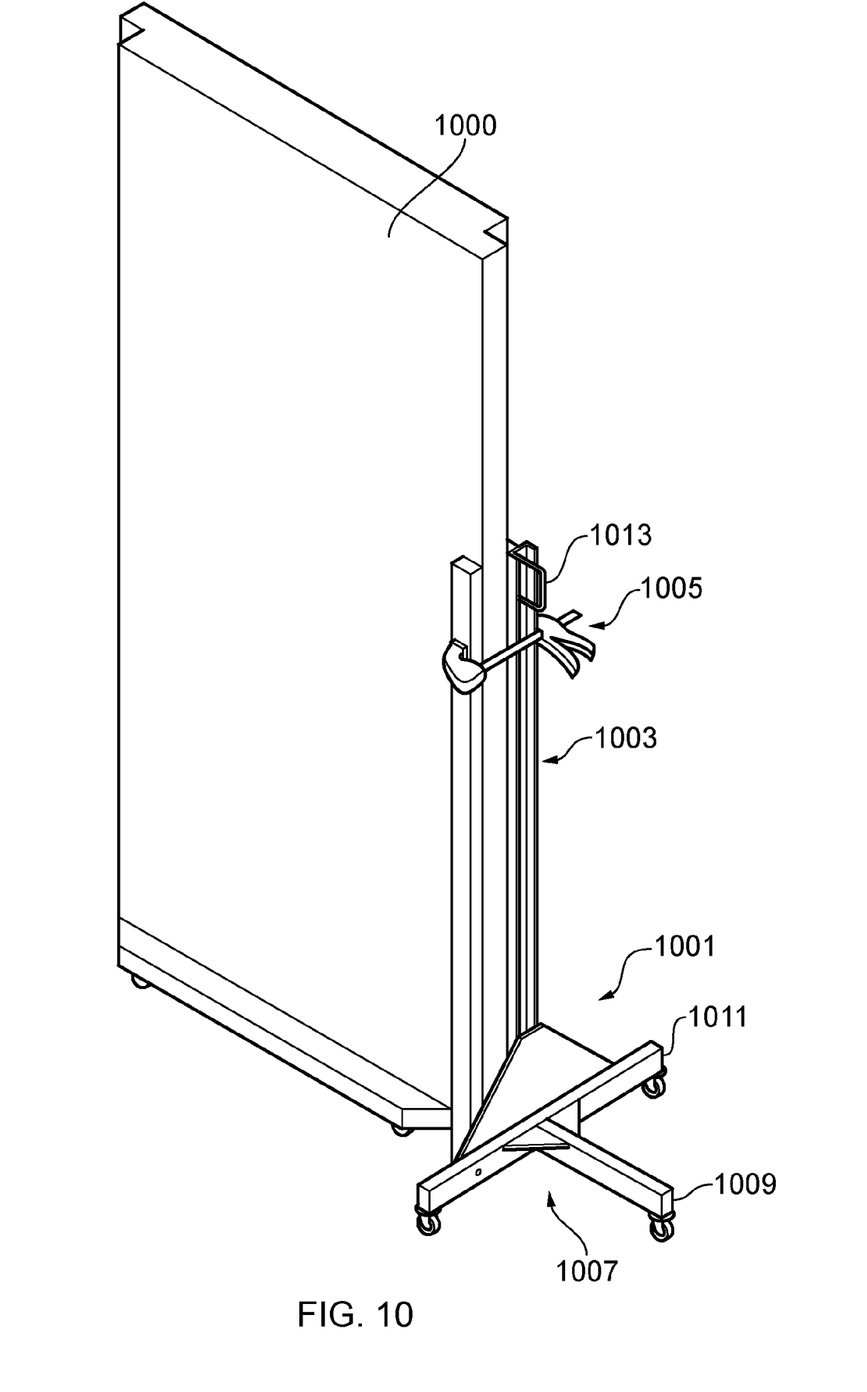
FIG. 10 is a perspective view of a trolley according to an example.

FIG. 10 is a perspective view of a trolley according to an example. More specifically, FIG. 10 shows a panel structure 1000 according to an example, to which a trolley 1001 is removably attached. The trolley can include a vertical channel system 1003 that can be clamped to a panel using a clamping device 1005 as shown for example. At the base of the channel system, a triad of legs 1007 each including a wheel or caster is provided. In the example shown, a minor arm 1009 stems orthogonally from a major arm 1011, which includes a wheel or caster at either end. It will be appreciated that, for the purpose of stability in movement, a trolley arrangement is not limited to that shown. For example, fewer or more arms may be provided.

The channel system can include a handle 1013 to assist a user in moving the panel once the arrangement is clamped in place.

The invention claimed is:

1. A panel structure for a demountable partition system, usable for dividing a room or for forming rooms or corridors or other structures,
    the panel structure having two opposite major faces and, in use, being positioned in a generally upright orientation, in which there are provided one or more rolling elements movable using a gearbox mechanism between an extended, ground-contacting position, and a retracted position within the panel structure, wherein
    the panel structure comprises a base portion and a panel portion carried on the base portion, and said one or more rolling elements and said gearbox mechanism are self-contained within the base portion,
    whereby the one or more rolling elements and the gearbox mechanism do not intrude into the panel portion to thereby maintain the integrity of the panel portion, in which
    there is provided a reinforced substantially bullet-proof layer between the said two opposite major faces of the panel structure,
    the said reinforced substantially bullet-proof layer lies in a plane inclined to the family of planes defined by the said two opposite major faces of the panel structure,
    the panel structure being defined along at least two opposite sides by edges having half lap tongues which overlap one another when two like panel structures are placed in juxtaposition with respect to one another,
    the said half-lap tongues on opposite edges of the panel structure are aligned with respective opposite major faces of the panel structure, and
    the said bullet-proof layer extends into each said half-lap tongue, whereby the bullet-proof layers of adjacent like panel structures of the demountable partition system overlap one another.

2. The panel structure as claimed in claim 1, in which the said one or more rolling elements comprise a plurality of wheels mounted in two or more groups with each group on a common support.

3. The panel structure as claimed in claim 2, in which each group comprises two or four wheels.

4. The panel structure as claimed in claim 1, wherein an operating characteristic of the panel structure is one of: bullet proofing, bullet proofing and acoustic proofing.

5. The panel structure as claimed in claim 1, wherein maintaining the integrity of the panel portion includes maintaining the integrity of the said two opposite major faces.

6. The panel structure as claimed in claim 1, in which the said one or more rolling elements comprise a plurality of wheels mounted in two or more groups with each group on a common support, in which the two or more groups of rolling elements are linked together for displacement of the rolling elements between the said extended and retracted positions in unison upon operation of a control member, and in which the gearbox mechanism for effecting displacement of the one or more rolling elements between the said extended and the said retracted positions comprises or includes a lead screw which causes or allows the wheels one or more rolling elements to move between the said extended and the said retracted positions when turned about its longitudinal axis.

7. The panel structure as claimed in claim 2, in which the two or more groups of rolling elements are linked together for displacement of the rolling elements between the said extended and the said retracted positions in unison upon operation of a control member.

8. The panel structure as claimed in claim 7, in which operation of said control member is effected by a lever or crank handle.

9. The panel structure as claimed in claim 2, in which a plurality of said common supports are linked together by a gear train which causes or allows the rolling elements to move together between the said retracted and the said extended positions.

10. The panel structure as claimed in claim 2, in which the said wheels are castor wheels.

11. The panel structure as claimed in claim 6, in which there is provided between the control member and the lead screw one of: a bevel gear, a helical gear, or a worm gear.

12. The panel structure as claimed in claim 1, in which at least part of the space between the said two opposite major faces of the panel structure contains a particulate material.

13. The panel structure as claimed in claim 12, in which the said particulate material comprises a hard stone aggregate, ceramic or metal balls or other particles, or sand.

14. A demountable partition system incorporating one or more panel structures as claimed in claim 1.

* * * * *